March 31, 1936. A. KRAUTZBERGER Re. 19,907
MEANS FOR COATING BY SPRAYING
Original Filed May 10, 1930
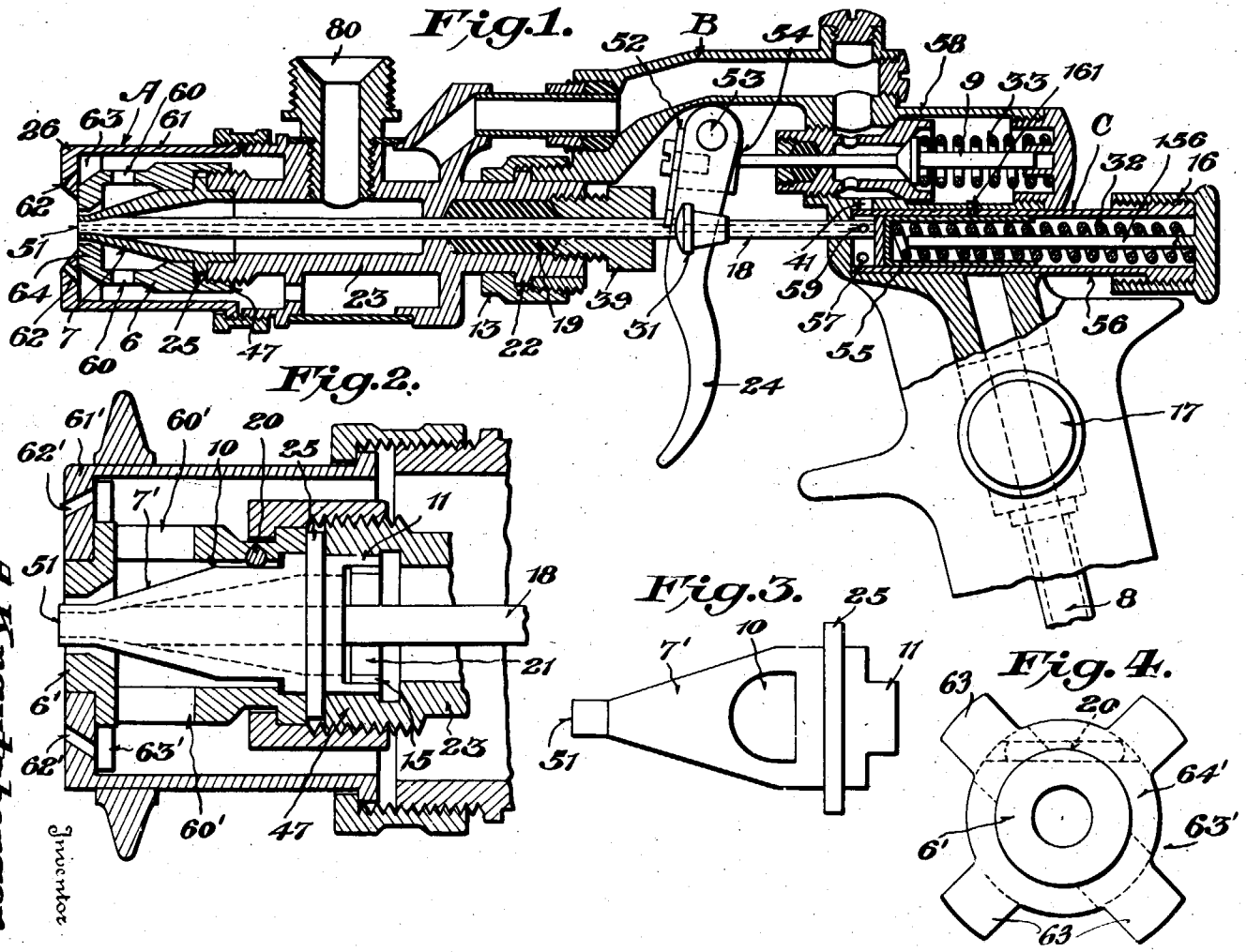
Inventor
A. Krautzberger,
By
Attorney Reissued Mar. 31, 1936

Re. 19,907

UNITED STATES PATENT OFFICE 19,907

MEANS FOR COATING BY SPRAYING

Albert Krautzberger, Holzhausen, near Leipzig, Germany, assignor to Royce A. Ruess, Washington, D. C.

Original No. 1,939,607, dated December 12, 1933, Serial No. 451,376, May 10, 1930. Application for reissue February 25, 1935, Serial No. 8,307. In Germany August 8, 1929

14 Claims. (Cl. 299—140.1)

This invention relates to apparatus for spraying on paint and the like.

In one class of paint spraying apparatus, hereinafter referred to as the compressed air system, the spraying is effected by compressed air which atomizes the mass to be sprayed, which may be drawn into the spraying nozzle by means of the compressed air or may be supplied thereto by means of a pump or by gravity, in which latter case considerable economy in operation is obtained. In all cases, however, the expanding compressed air disperses the mass in the form of a mist or the like, except in the case of pressure fed apparatus, when the mass is fed at a pressure which is excessive as compared with that of the compressed air, in which the mass is expelled in the form of a more or less compact solid jet, which is useful for cleaning and other purposes.

Spraying pistols or guns have been proposed comprising a body or handle portion and a spraying head detachably secured thereto and having a spraying nozzle for the material to be sprayed, a supply channel for conveying the said material to the nozzle, an air channel and an air discharge nozzle which co-operates with the spraying nozzle, the exit of the material to be sprayed from the spraying nozzle being controlled by means of a valve spindle passing rearwardly through the spraying head and operated by a control member mounted on the handle or body portion, which member is also arranged to control the supply of compressed air to the air discharge nozzle. In this construction, the spraying nozzle is screwed into the spraying head, which is mounted on the body or handle portion by inserting into a tubular portion of the latter a rearwardly extending tubular member through which the valve spindle is passed, the said tubular member being held in position by means of a clamping nut on a screw pin fixed on the tubular member and passing through a slot in the tubular portion of the body or handle, while the supply of air to the air discharge nozzle is controlled by a second valve spindle passed through a second rearwardly extending tubular member on the spraying head.

According to the present invention, the air supply to the air discharge nozzle is controlled by means of an air valve through which the compressed air is supplied to the spraying head and which is arranged on the handle or body portion of the pistol offset with respect to the valve spindle. The movement of the valve spindle, which is effected by hand, pneumatically and mechanically, is controlled by a controlling piston slidable in the body of the pistol, and operated in spindle seating direction preferably by a spring, and in the opposite direction both manually and pneumatically. Preferably adjusting means is provided on the body of the pistol for limiting the displacement of the piston.

The invention is illustrated by way of example in the accompanying drawing, in which Figure 1 shows a hand-operated spraying pistol in longitudinal section. Figure 2 shows the spraying head slightly modified in longitudinal section. Figure 3 shows the spraying nozzle of Fig. 2 in elevation and Figure 4 shows the centering head as seen from the front in Fig. 2.

Referring to the drawing, 8 is a compressed air supply tube which communicates with an air valve chamber 58 containing an air valve 9 which is pressed against its seat in the chamber by means of a spring 33. The air valve 9 is raised from its seat, when required, against the force of the spring 33 by means of a lever 24 which engages the end of the valve spindle at a point 54 near the pivot 53 of the lever. Below the valve chamber 58 is provided a rotatable sleeve 56 which is closed at both ends and has a lateral opening 57 near its forward end, which opening is adapted to register with an opening 41 in the valve chamber 58 when the sleeve 56 is turned into the appropriate position. By this means, compressed air can be admitted to the sleeve 56 when required and shut off therefrom when not required. A hollow spindle 18 arranged below the valve 9 extends with its rear end into the sleeve 56 so as to be slidable therein against the action of a spring 32 which is passed into a piston 55. The rear end of the spindle bears against the forward end of the piston 55 and its longitudinal axis is at a higher level than that of the piston, an aperture 59 in this end of the hollow spindle 18 permitting air to pass into its interior from the sleeve 56. The forward end of the spindle 18 is guided in the spraying head A and serves as control valve for shutting off the supply of paint or other material to be sprayed at 51, while compressed air can be supplied through its hollow interior to the centre of the jet issuing from the spraying head. The spindle 18 is displaced axially to permit the exit of paint or other material from the spraying head by means of a projection 31 which is engaged by a driving member 52 fixed to the lever 24, so that the spindle 18 and valve 9 can both be actuated by it. By this arrangement, the spring 32 of the paint supply control valve constituted by the spindle 18 can be made sufficiently large to ensure the spindle having a sufficient axial displacement, while the position of the air valve spindle above the paint supply control spindle and the placing of both spindles behind the lever 24 enables the most satisfactory leverage and distribution of weight to be obtained.

The pivot of the lever 24 is placed at a height above the spindle 18 which will produce the most favourable leverage. The air valve spring 33 pushes the lever 24 so far forward that the driving member 52 is moved out of engagement with the projection 31, the spring 32 being able to push the piston 55 and the spindle 18 forward a distance of from 3 to 6 mm. or other suitable distance required for allowing the spraying head A to be fitted to the body B. By this arrangement the lever 24, when moved rearwardly to open the valves, has an initial lost movement relative to the projection 31, so that the air valve 9 is opened slightly in advance of the material valve 18. This arrangement of the parts also enables the spindle 18 to be guided so as to work easily and still allow no paint or solvent to escape in spite of the considerable spraying pressures, the spindle 18 being guided in a centering collar 22 and packed by a relatively long spindle packing 19 in the spraying head, while the favourable leverage of the lever 24 enables the spindle to be axially displaced with very little force. The closing end of the spindle 18 is also enabled to seat itself properly on its seating in the spraying head.

The spraying head A comprises a tubular member 23 to which the material to be sprayed is supplied through an inlet 80, the centering collar 22 forming a rearward extension of said tubular member. The spraying head is connected to the body part B in proper alignment by means of the centering collar 22 and a union nut 13 which fits over the centering collar and is screwed on to a suitable threaded part of the part B. On the forward threaded end 47 of the tubular member 23 is secured a nozzle 7 which has a collar 25 which is pressed against the threaded end of the member 23 by means of a shoulder on a centering head 6 which is screwed on to the threaded end 47 (Fig. 1).

The centering head 6 is constructed so as to form an air nozzle surrounding the nozzle 7 and is provided with lateral inlet openings 60. The spraying head is provided with a cover 61 having oblique apertures 62 for enabling air to flow round the outside of the mass being sprayed to a point in front of the face of the spraying head.

The passage of air to the apertures 62 is controlled by means of slots 63 in a part 64 of the air nozzle 6, the quantity of air passing through the apertures being varied by turning the cover 61 so as to change the positions of the apertures with respect to the slots 63.

In order to prevent rotation of the air nozzle 6 when the cover 61 is turned, in the constructional form of spraying head shown in Figures 2–4 the air nozzle is not screwed to the end of the tube 23 but is secured thereto by means of a union nut. Inside the end of tube 23 is a collar 21 which has two grooves 15, the nozzle 7 having two lugs 11 which slide into engagement with the grooves 15 on being fitted to the tube 23 in the manner of a tongue and groove. The air nozzle 6′ is in turn prevented from turning with respect to the nozzle 7′ by means of a pin 20 driven axially through the nozzle 6′ and bearing against a flat 10 on the outside of the nozzle 7′.

The leather packing 19 is compressed by the stuffing box gland 39 in accordance with the pressure of the circulating mass. In order to be more easily operated (with the thumb and first finger of the left hand) the gland 39 is grooved and provides a metallic guide for the regulating spindle 18. Any differences in direction which may occur in consequence of wear at this part or anywhere else are compensated by the piston 55 which slides in the end tube 56. On the tube 56 is screwed the stroke regulating cap 16. By means of the latter the stroke of the adjusting piston 55 and that of the spindle 18 and consequently the distance to which the mass can be thrown and the thickness of the jet are determined. The cap 16 is for this purpose provided with an internal axially extending rod 156 forming a stroke limiting stop against which the inside end wall of the piston strikes on being moved rearwardly by the lever 24 and spindle 18, the stroke of the piston being determined by the position of the cap 16.

A stop pin 161 screwed into lower wall of the valve chamber 58 and engaging in a peripheral slot in the sleeve 56 limits the rotary movement of the sleeve and at the same time prevents the sleeve from being forced out by the spring 32.

The compressed air is conveyed through the tube 8 under the control of a supply control valve 17 to the valve chamber 58 and from there flows through the part B to the spraying head A, and when required, also passes through the aperture 41 to the hollow spindle 18. The valve 17 determines the air pressure and the quantity of air supplied, while the air valve and piston of the rotary sleeve 55 determine the kind of jet and its thickness.

It is apparent that when the valve 9 is open, the air under pressure, which is admitted to sleeve 56 in advance of the piston 55, will counteract, to some extent at least, the pressure of the spring 32 and thus lessen, to such extent, the pressure required to be applied to the hand lever 24 to hold the valve spindle 18 open during operation. This feature is important, as it renders the use of the spray-gun less tiring to the operator, particularly under prolonged spraying operations, and requires less pressure to retract the valve 18 than would otherwise be the case, and at the same time enables the full pressure of the spring 32 to be utilized to hold the valve seated when the gun is not in use.

It is evident that the admission of air to the forward end of the chamber in which the piston 55 works and to the passage through the valve spindle 18 may be regulated by a turning of the sleeve 56 to place the ports 41 and 57 entirely into or out of register or partially in register. In this way, the pressure of the air in the piston chamber, which counteracts the valve spindle closing pressure of the spring 32, can be regulated to suit requirements.

What I claim is:

1. A spraying pistol comprising the combination with a body portion and a spraying head detachably secured thereto and having a spraying nozzle for the material to be sprayed, a supply channel for conveying said material to said nozzle, an air channel, an air discharge nozzle associated with the spraying nozzle and a valve spindle for controlling the exit of the material to be sprayed from the spraying nozzle, said valve spindle being passed through the spraying head so as to extend rearwardly therefrom, of a rearwardly extending tubular member on the spraying head through which the valve spindle is passed, said tubular member having a centering collar thereon, a screw-threaded part on the body of the pistol adapted to receive said tubular member and an adjusting nut fitted over said centering collar so as to be rotatable thereon and screwed on said screw-threaded part on the body of the pistol, a control member for actuating said valve spindle mounted on said body portion, said body portion of the spraying pistol having an air supply conduit in open communication with the air channel in the spraying head and an air valve for controlling the supply of compressed air to said air channel, said air valve arranged in said body portion offset with respect to said valve spindle and having a portion thereof projecting out of the body portion so as to be actuatable by the said control member for actuating the valve spindle.

2. A spraying pistol comprising the combination with a body portion and a spraying head detachably secured thereto and having a spraying nozzle for the material to be sprayed, a supply channel for conveying said material to said nozzle, an air channel, an air discharge nozzle associated with the spraying nozzle and a valve spindle for controlling the exit of the material to be sprayed from the spraying nozzle, said valve spindle being passed through the spraying head so as to extend rearwardly therefrom, a sleeve in the body of the pistol positioned therein with its axis offset with respect to the axis of the valve spindle, said sleeve having an inlet for admitting compressed air to its interior and being rotatable from a position with said inlet out of open communication with the air supply conduit in the body portion of the pistol into a position in open communication therewith, a controlling piston slidable in the body of said sleeve for controlling the movement of the valve spindle, said valve spindle being hollow and having its rear end passed into the body portion of the pistol so as to engage the controlling piston with the interior of the valve spindle in open communication with the interior of the rotatable sleeve, a control member for actuating said valve spindle mounted on said body portion, said body portion of the spraying pistol having an air supply conduit in open communication with the air channel in the spraying head and an air valve for controlling the supply of compressed air to said air channel, said air valve arranged in said body portion offset with respect to said valve spindle and having a portion thereof projecting out of the body portion so as to be actuatable by the said control member for actuating the valve spindle.

3. In a material discharge gun, a material valve, means acting on said valve to exert a predetermined closing pressure thereon, means manually operable to open the valve against said closing pressure, and means pneumatically operable to counteract a portion of the closing pressure of said first means.

4. In a spray gun, a material control valve, an air pressure control valve, means acting on the material valve to exert a closing pressure thereon, means manually operable to open the air valve and also the material valve against the pressure of said means, said closing means being automatically operable by air pressure, when the air valve is open, to counteract a portion of the closing pressure of the closing means.

5. In a spray gun, a normally closed air valve and a normally closed material valve for the gun, spring pressure means acting cn the material valve to exert a closing pressure thereon and including a cylinder and piston at the outlet side of the air valve and in communication with the passage controlled thereby, said piston being operable by air pressure, when the air valve is open, to counteract a portion of the closing pressure of the closing means, and manually operable means for opening said valves.

6. In a spray gun, an air valve and a material valve for controlling the respective discharge of air and material from the spray gun, the air valve being normally closed, a spring pressed plunger normally operable to exert a predetermined closing pressure on the material valve and pneumatically operable by air pressure when the air valve is opened to partially relieve said closing pressure, and manually operable means to open the air and material valves one in advance of the other.

7. In a spray gun, normally closed control valves respectively for the air and material discharge, a plunger exposed to the air discharging pressure at the outlet side of said valve and having connection with the material valve, means yieldingly acting on said plunger to cause it to exert a predetermined closing pressure on the material valve, said plunger being operated by air pressure, when the air valve is open, to counterbalance a portion of the pressure of said yielding means against the plunger, means manually operable to open first said air valve and then the material valve, and means for adjusting the tension of said pressure means.

8. In a spray gun, normally closed control valves respectively for the air and material discharging from the gun, a plunger having closing coaction with the material valve, a spring acting against said plunger to exert a predetermined valve-closing pressure thereon, said plunger being exposed at one side to the air discharging pressure when the air valve is open and being automatically operable by such air pressure to counteract a portion at least of the closing pressure of said spring, and means manually operable to open said air and material valves.

9. In a material discharge gun, a material valve, means acting on said valve to exert a predetermined closing pressure thereon, means manually operable to open the valve against said closing pressure, and means rendered operable by a predetermined valve opening movement of said manually operable means to counteract a portion of the closing pressure of said first means.

10. In a material discharge gun, a material valve, means acting on said valve to exert a predetermined closing pressure thereon, means manually operable to open the valve against said closing pressure, means operable to counteract a portion of the closing pressure of said first means, and means actuated by a valve opening movement of said manually operable means to render said last means active.

11. In a spray gun, a material control valve, pressure means normally exerting a closing pressure on said valve, means operable to open the valve against said closing pressure, and means rendered operable by a predetermined valve opening movement of said operating means to counteract a portion of the valve closing pressure of said pressure means.

12. In a spray gun, a spray head having a material discharge passage, a material control valve for said passage, means acting on said valve to exert a predetermined closing pressure thereon, means manually operable to open said valve against said closing pressure, means pneumatically operable to counteract a portion of the closing pressure of said first means, and means adjustable to vary the degree of action of said pneumatic means.

13. In a spray gun, an air cylinder, a piston working in said cylinder, a material control valve in connection with said piston, yielding pressure means for imparting a valve seating movement to said piston, means manually operable to open said valve against said pressure means, means rendered operative by movement of said manual means to admit air under pressure to said cylinder to act against said piston and counteract to a predetermined extent the valve seating action of said pressure means, and means for regulating the air pressure in said cylinder.

14. In a spray gun, a spray head having air and material discharge passages, a valve for closing said material discharge passage, a cylinder, a spring pressed piston in said cylinder coacting with said valve and acting to normally hold the valve seated, means manually operable to unseat said valve against the seating spring pressure, means forming an air pressure supply passage in communication with the air discharge passage of the spray head, said supply passage also having communication with said cylinder to admit air under pressure thereto to counteract a portion of the valve closing pressure of said piston, a valve for closing said supply passage anterior to its communication and opened by a predetermined movement of said manual means, and means for controlling the admission of air pressure to said cylinder.

ALBERT KRAUTZBERGER.